United States Patent
Yoo et al.

(10) Patent No.: US 7,583,669 B2
(45) Date of Patent: Sep. 1, 2009

(54) DYNAMIC MULTICAST GROUP MANAGEMENT AND SERVICE WAVELENGTH ALLOCATION METHOD FOR COMMUNICATION-BROADCASTING CONVERGENCE SERVICE IN WDM-PON

(75) Inventors: Jeong Ju Yoo, Daejeon (KR); Tae Yeon Kim, Daejeon (KR); Hyun Ho Yun, Daegu (KR); Byoung Whi Kim, Daejeon (KR); Nam Uk Kim, Daejeon (KR); Jae Gwan Kim, Daejeon (KR); Bok Rae Jung, Daejeon (KR); Min Ho Kang, Daejeon (KR)

(73) Assignees: Electronics & Telecommunications Research Institute (KR); Research and Industrial Cooperation Group (KR)

(*) Notice: Subject to any disclaimer, the term of this patent is extended or adjusted under 35 U.S.C. 154(b) by 490 days.

(21) Appl. No.: 11/133,071

(22) Filed: May 18, 2005

(65) Prior Publication Data
US 2006/0127091 A1    Jun. 15, 2006

(30) Foreign Application Priority Data
Dec. 13, 2004    (KR)    ....................... 10-2004-0104938

(51) Int. Cl.
*H04L 12/28*    (2006.01)
*H04J 14/00*    (2006.01)
*H04B 15/00*    (2006.01)

(52) U.S. Cl. ........................... 370/390; 398/69; 455/62
(58) Field of Classification Search .................. 370/390
See application file for complete search history.

(56) References Cited

U.S. PATENT DOCUMENTS

| 2003/0123453 | A1 | 7/2003 | Ooghe et al. |
| 2004/0184806 | A1* | 9/2004 | Lee et al. ...................... 398/79 |
| 2004/0246984 | A1* | 12/2004 | Hundscheidt et al. ....... 370/432 |
| 2004/0266351 | A1* | 12/2004 | Chuah et al. .................. 455/62 |

FOREIGN PATENT DOCUMENTS

WO    WO 98/48343    10/1998

* cited by examiner

*Primary Examiner*—Daniel J Ryman
*Assistant Examiner*—John Blanton
(74) *Attorney, Agent, or Firm*—Blakely, Sokoloff, Taylor & Zafman

(57) ABSTRACT

The present provides a method of dynamically managing multicast groups and allocating multicast service wavelengths for the highest channel efficiency. According to the present invention, the share indices of wavelengths of all multicast service groups, which employ broadcasting wavelengths and data wavelengths, are periodically ascertained on the basis of IGMP snooping-based technology in a WDM-PON. Based on the ascertainment results, if the channel share index of the group that employs the broadcasting wavelength is smaller than the channel share index of the group that employs the data wavelength, the share index of the wavelength of the multicast group that employs the broadcasting wavelength is maximized by dynamically changing allocation of the wavelength of the multicast group, so that a maximum multicast service can be provided within limited resources.

10 Claims, 5 Drawing Sheets

DYNAMIC MULTICAST GROUP MANAGEMENT AND SERVICE WAVELENGTH ALLOCATION METHOD FOR COMMUNICATION-BROADCASTING CONVERGENCE SERVICE IN WDM-PON

BACKGROUND OF THE INVENTION

1. Field of the Invention

The present invention relates generally to dynamic multicast service in a wavelength division multiplexed passive optical network (WDM-PON) and, more particularly, to a method of dynamically managing multicast groups and allocating multicast service wavelengths for maximal channel efficiency by ascertaining the channel share index of multicast groups that occupy a limited broadcasting wavelength when the multicast groups are changed in a hybrid type WDM-PON.

2. Description of the Prior Art

Communication having a point-to-point information exchange function has limited and personal effects because information flow occurs bi-directionally and in connection with specific individuals. In contrast, broadcasting having a point-to-multipoint information distribution function is characterized in that information flow occurs uni-directionally and information is shared by a plurality of subscribers.

Technology fields for providing broadcasting service and communication service at the same time through a communication network so as to accommodate the broadcasting service on behalf of existing communication carriers includes a Photonic Local Access Network (PLANET), which is a project to evolve a subscriber line to a broadband network in the Advanced Communications Technologies and Services (ACTS) project that is now being promoted in Europe, and Internet broadcasting, into which media, communication and broadcasting are converging.

In the ACTS-PLANET, SuperPON capable of reducing investment cost has been developed. SuperPON has a downstream transfer rate of 2.5 Gbps and an upstream transfer rate of 311 Mbps. Such SuperPON aims to provide subscribers with High Definition Television (HDTV) class services, such as Video on Demand (VoD), that have a very high downstream transfer rate. The signals of SuperPON are separated by a WDM filter. It should be noted that a PLANET amplified splitter includes an optical amplifier and an optical splitter, similar to those of a conventional Asynchronous Transfer Mode Passive Optical Network (ATM-PON). SuperPON has developed toward the improvement of a split ratio and a transfer capacity in an existing ATM-PON or Ethernet-PON.

As the transfer rate of the Internet gradually increases with the development and introduction of subscriber network technology, Internet broadcasting has changed to the form of using a streaming technology that plays an audio file or a video file while directly receiving the video or audio file. Currently, Internet broadcasting is in the process of changing from Asymmetric Digital Subscriber Line (ADSL) to Fiber-to-the-Home (FTTH) to expand the bandwidth of the access line. Korean communication carriers have made a variety of efforts to create new business opportunities via the Internet broadcasting service. It is expected that regular Internet broadcasting service will be launched soon.

In recent years, Internet traffic has exhibited an exponential increase in capacity due to the advent and popularization of a broadband application that provides high-quality audio and image data to service subscribers in real time. More particularly, with the advent of integrated network service that is intended to provide a communication-broadcasting convergence service through a single data transmission network, it is expected that the trend toward increased traffic will continue. Such a broadband service can be accommodated without significant burden in a backbone network or a metropolitan area network in which an increase in available capacity has been continuously achieved. However, a current subscriber network structure has many problems providing such real-time broadband service due to a narrow bandwidth per subscriber and the coexistence of various protocols.

The FTTH-based optical subscriber network project that is now being promoted aims to provide an optical technology-based broadband transmission bandwidth by deploying optical fiber between individual service subscribers and a central office. For this purpose, related technologies, such as an optical line installation technology, a Wavelength Division Multiplexing (WDM) technology, an optical element technology and an optical line distribution technology, for constructing an efficient and economical optical subscriber network based on optical technologies that have been used in an existing backbone have been rapidly developed. Research into ATM and Ethernet-based PON on a single star type subscriber network has been actively conducted, and is reaching a commercialization stage now. However, it is expected that the PON employing Time Division Multiplexing (TDM) will be developed toward a WDM-PON that allocates an independent wavelength to each subscriber while satisfying a desired bandwidth, due to the limitation in transmission capacity. Research into the WDM-PON is being actively conducted in U.S.A., Japan, Europe and elsewhere.

The WDM-PON is an optical distribution structure that can provide gigabit-class large-capacity data service without burden because an individual wavelength is allocated to each subscriber. More particularly, a hybrid type WDM-PON in which all the Optical Network Terminals (ONTs) of the network share a broadcasting channel, in addition to an individual data channel, is highly advantageous to the future accommodation of a broadcasting type multicast service because all the data are physically distributed to all the ONTs in an optical layer.

The FTTH WDM-PON aims to allocate sufficient bandwidth for the provision of a variety of services by providing an optical link to an ONT that is a termination device in a subscriber home. In this case, the ONT becomes an independent individual service termination point where the traffic and concentration of other subscribers are not achieved, unlike the Optical Network Unit (ONU) of a Fiber To The Curb (FTTC) network. Accordingly, the pattern of actual service traffic between an Optical Line Terminal (OLT) and the ONT exhibits very dynamic variation in bandwidth, not long-term consistent duration of bandwidth, based on the pattern of the Internet use of a user. This trend is more distinct in data services, such as common file transfer, image communication and high-quality VoD, than in broadcasting services in which a request for unidirectional bandwidth from a multicast server to an ONT is continuous. Therefore, the OLT within the hybrid type WDM-PON separates a consistent broadcasting service and a typical data service from each other and transmits them using different wavelengths, thus preventing the quality of the broadcasting service from being degraded due to the data service. Further, the OLT within the hybrid type WDM-PON manages multicasting and groups per port so that a broadcasting channel can be maximally shared within a limited bandwidth. Basically, the OLT monitors the addition and removal of multicast groups between the multicast router and the ONT using Internet Group Management Protocol (IGMP) snooping. When a new broadcasting service channel is established between them, its transmission is achieved using a shared optical broadcasting wavelength. Since such broadcasting data frames are distributed to all ONTs by a downstream optical splitter in a physical layer, an ONT that belongs to a corresponding group can receive the frame simply through filtering. It is thus possible to increase the share index of resources within the network.

In the case in which the OLT allocates the broadcasting channel in this First Come First Service (FCFS) mode, however, if all of the broadcasting wavelength is occupied by existing multicast groups, there occurs a problem in that a service request by a new multicasting group cannot be made using the broadcasting wavelength at a specific time point due to the bandwidth of a limited broadcasting wavelength. In this case, the OLT carries out multicasting using an independent data wavelength of each ONT. This is the same as the point-to-point multicasting mode within a conventional switch. If the number of service ONTs of the multicast service provided using the broadcasting type optical wavelength is smaller than the number of ONTs within the multicast group that employs the data optical wavelength, this results in the waste of a shared channel. As a result, the advantages of the hybrid structure are not properly made use of.

As described above, an efficient management scheme for accommodating a large number of broadcasting type multicast services and data services within the bandwidth of a limited broadcasting wavelength has not yet been proposed. Particularly, a scheme for efficiently accommodating multicast services within limited resources has not yet been proposed.

Meanwhile, U.S. Pat. Appl. Publication No. 2004/0184806 (entitled "Wavelength Division Multiplexing-Passive Optical Network capable of Integrating Broadcast and Communication Services") discloses a PON that transmits a converged digital broadcasting and communication service using WDM. Further, U.S. Pat. Appl. Publication No. 2003/0123453 (entitled "Method and Apparatus of Directing Multicast Traffic in an Ethernet MAN") discloses a method of managing a two-layer multicast group and a virtual LAN through an IGMP packet in an Ethernet switch so that even hosts that do not support Generic Attribute Registration (GARP) Multicast Registration Protocol (GMRP) and GARP Virtual Local Area Network (VLAN) Registration Protocol (GVRP) can participate in a desired two-layer multicast group and a virtual LAN of the Ethernet using the IGMP packet of the IP layer. Moreover, International Publication Number WO 98/048343 (entitled "System, Device, and Method for Managing Multicast Group Memberships in a Multicast Network") discloses a system, device, and method for offloading the multicast routing protocols from local routers in a multicast network.

The preceding patents, however, do not disclose technology in which channel efficiency for an individual multicast group that employs the broadcasting wavelength within the bandwidth of a limited broadcasting wavelength in a WDM-PON is maximized. In particular, they do not present a method for multicast group management and wavelength allocation on a service basis for maximizing the service efficiency of multicast groups.

SUMMARY OF THE INVENTION

The present invention provides a dynamic multicast group management and multicast service wavelength allocation method for a communication-broadcasting convergence service in a WDM-PON, which can efficiently provide a maximal number of broadcasting type multicast services to subscribers by maintaining the highest channel share index within the bandwidth of a limited broadcasting wavelength through the real-time dynamic management of multicast groups and the allocation of wavelengths on a service basis in a hybrid type WDM-PON.

The present invention provides a method of dynamically managing multicast groups for communication-broadcasting convergence in an IGMP snooping-based WDM-PON having an OLT and a plurality of ONTs, including the first step of allowing the OLT to allocate individual data wavelengths $\lambda_c$ and a shared broadcasting wavelength $\lambda_b$ to the respective ONTs, and checking an IGMP control message between the individual ONTs and a multicast server; the second step of, if the message is a multicast group join message of a specific ONT as a result of the checking at the first step, determining whether the group is a newly created group or an existing registered group; the third step of, if it is determined that the group is a newly created group as a result of the determination at the second step, determining a multicast type of the group by ascertaining the depth of allowable maximum multicast groups within a bandwidth of the broadcasting wavelength $\lambda_b$; and the fourth step of, if the group is the existing registered group as a result of the determination at the second step, registering port information corresponding to the ONT in an information table within the OLT, and improving the share index of the group by ascertaining the depth of the allowable maximum multicast groups within the bandwidth of the broadcasting wavelength $\lambda_b$.

In addition, the present invention provides a method of dynamically allocating multicast service wavelength for communication-broadcasting convergence in an IGMP snooping-based WDM-PON having an OLT and a plurality of ONTs, including the wavelength allocation step of allowing the OLT to allocate individual data wavelengths $\lambda_c$ and a shared broadcasting wavelength $\lambda_b$ to the respective ONTs; the first data transmission step of allowing the OLT to transmit data for broadcasting through the shared broadcasting wavelength $\lambda_b$ and data for control through the individual data wavelengths $\lambda_c$; the determination step of determining whether the bandwidth of the shared broadcasting wavelength $\lambda_b$ is exceeded; and the second data transmission step of, if the bandwidth of the shared broadcasting wavelength $\lambda_b$ is not exceeded, continuing to transmit the data for broadcasting through the shared broadcasting wavelength $\lambda_b$, and if the bandwidth of the shared broadcasting wavelength $\lambda_b$ is exceeded, transmitting data for broadcasting and data for control, which are formed subsequently, through the shared data wavelength $\lambda_c$.

According to the present invention, the share indices of channels of all multicast groups, which employ broadcasting channels and dedicated data channels, are ascertained periodically or whenever group information is changed on the basis of IGMP snooping-based technology in a hybrid type WDM-PON. Based on the ascertainment results, if the channel share index of the group that employs the broadcasting wavelength is smaller than the channel share index of the group that employs the data wavelength, the share index of the wavelength of the multicast group that employs the broadcasting wavelength is maximized by dynamically changing allocation of the wavelength of the multicast group, so that a maximum multicast service can be provided using limited resources.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will now be described in detail in connection with preferred embodiments with reference to the accompanying drawings.

Figure 1:
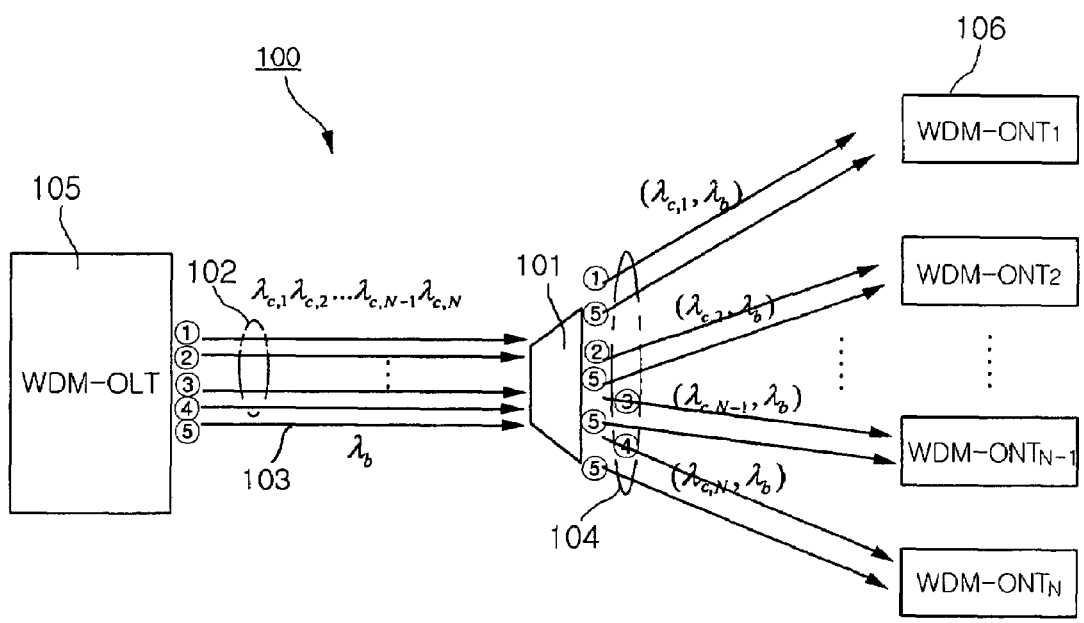
FIG. 1 is a view showing the entire configuration of a hybrid type WDM-PON to which the present invention is applied.

FIG. 1 is a view showing the entire configuration of a hybrid type WDM-PON to which the present invention is applied.

As shown in FIG. 1, the hybrid type WDM-PON 100 to which the present invention is applied has a typical tree structure that is centered around an optical splitter 101. The hybrid type WDM-PON 100 has a cost saving effect because optical fiber used in a plurality of subscriber services is shared up to a maximum distance. In order to apply WCM technology to a PON type subscriber distribution structure, a wavelength multiplexer/demultiplexer that separates a plurality of multiplexed wavelengths from a single strand of optical fiber is employed as the optical splitter 101. According to current technology, a maximum of about 16 or 32 wavelengths can be used through the use of an Arrayed Waveguide Grating (AWG). An WDM-OLT 105 allocates $\lambda_c$, 102, which is a wavelength for use in full duplex-type communication data services, to each of the ONTs 106 through the multiplexer (or demultiplexer), so that a total of N logical point-to-point type data service networks are formed. Further, the OLT 105 allocates $\lambda_b$ 103, which is a wavelength for use in half duplex communication-type broadcasting services, to all the ONTs 106 through wavelength distribution via the optical splitter 101, in which case the wavelength $\lambda_b$ is shared by all the ONTs 106. Accordingly, an individual ONTi is allocated with a pair of a data wavelength $\lambda_{c,i}$ and a shared broadcasting wavelength $\lambda_b$ ($\lambda_{c,i}, \lambda_b$) 104. Such a hybrid type WCM-PON 100 can not only basically provide a higher bandwidth than a TDM-based combined WDM network structure, but also allow signal division in an optical layer for the provision of a communication-broadcasting convergence service in the future, thus providing structurally excellent service characteristics. In the structure shown in FIG. 1, all control data, such as messages for the registration of group and leave from groups, and the queries and responses of multicast groups, employ $\lambda_c$, and $\lambda_b$ accommodates only multicast data traffic.

Figure 2:
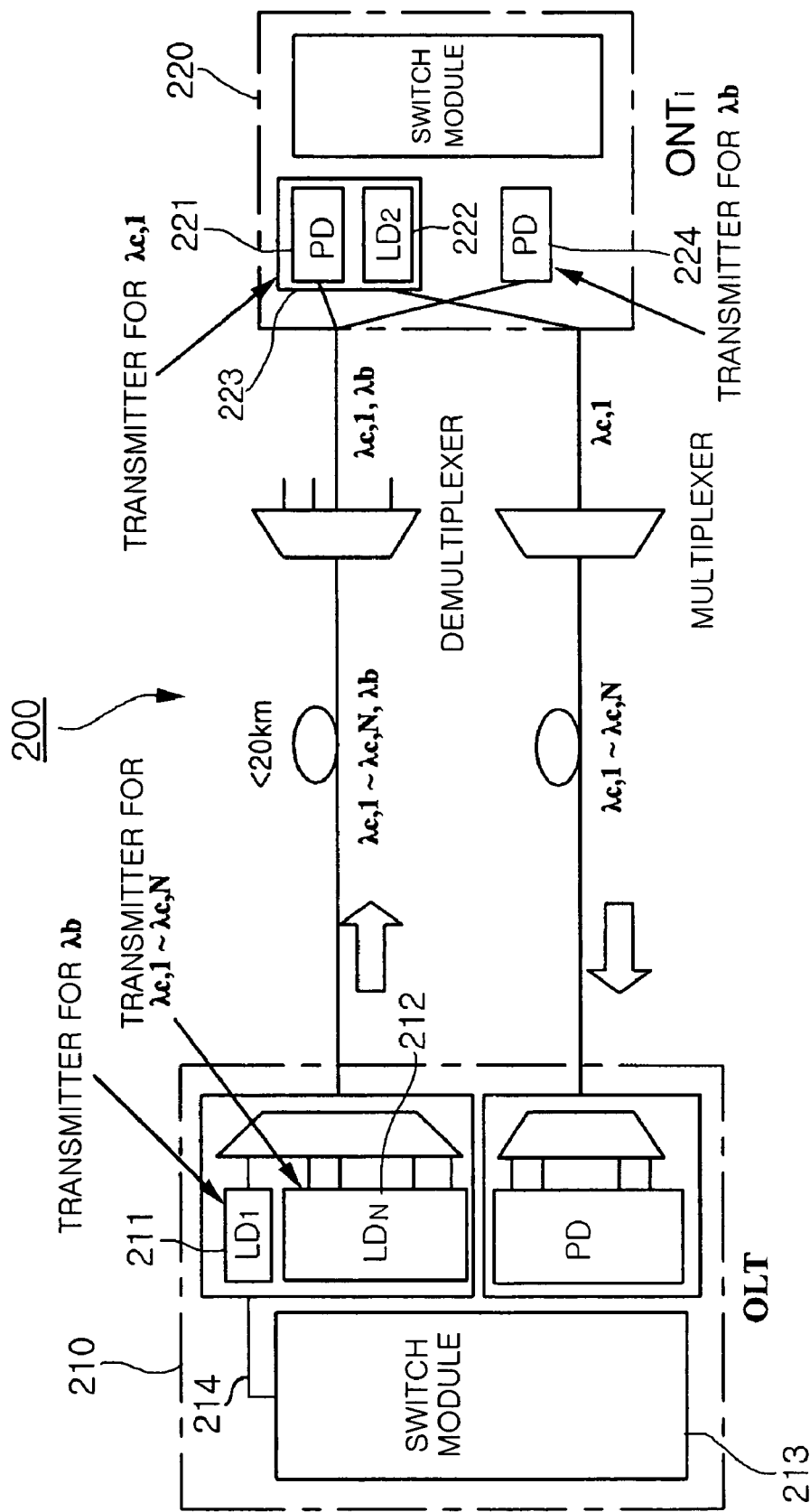
FIG. 2 is a schematic view of the ONT and the OLT in the hybrid type WDM-PON according to an embodiment of the present invention.

FIG. 2 is a schematic view of an ONT and an OLT in a hybrid type WDM-PON according to an embodiment of the present invention. As shown in FIG. 2, in a hybrid type WDM-PON system 200, the broadcasting service port 214 of the OLT uses a single fixed type laser $LD_1$ 211 for transmission through the broadcasting wavelength $\lambda_b$, and uses N lasers $LD_N$ 212 having an array structure for the individual data wavelength $\lambda c$. The switch module 213 of the OLT switches broadcasting data to a corresponding single port, and switches multicasting traffic, which is formed after the bandwidth $\lambda_b$ is exceeded and employs a common data channel, or common Internet data traffic to a corresponding port, using IGMP snooping and VLAN technology. The switch module 213 also functions to maintain a table by snooping all packets relating to the control of multicast groups between the multicast server and the ONT. Each ONTi 220 includes a data transceiver module 223 composed of a pair of a fixed type Photo Detector (PD) 221 and a fixed type laser $LD_2$ 222 that receives and transmits data through the individual data wavelength $\lambda_{c,i}$, and a fixed type PD 224 that receives a broadcasting service through the shared $\lambda_b$. Accordingly, in the case of downstream traffic transmission extending from the OLT 210 to the ONT 220, a broadcasting service and a common data service are basically operated independently of each other.

Figure 3:
FIG. 3 shows a table structure for dynamic multicast group management and service wavelength allocation in the OLT of the WDM-PON according to the present invention.

FIG. 3 shows a table structure for dynamic multicast group management and service wavelength allocation in the OLT of the WDM-PON according to the present invention.

More particularly, FIG. 3 shows an IGMP-VLAN and port management table structure that is produced by the OLT to efficiently support a plurality of multicast services while maintaining the maximal channel share index of the broadcasting wavelength $\lambda_b$. As described above, multicasting is provided through the shared type wavelength $\lambda_b$ in a unidirectional half duplex communication mode. IGMP query and response messages are all transmitted through $\lambda_c$ is independently allocated to each ONT.

Therefore, as illustrated in the multicast group management table 300 of FIG. 3, when the OLT recognizes that a multicast service Group 1 is established among the multicast server, the multicast router, and the ONTs through IGMP snooping (11), the OLT switch module 213 creates a non-allocated VLAN (a), and allocates the created VLAN (a) to the Group 1 (12). The OLT switch module 213 then registers the number of a data channel through which an IGMP response message is received, that is, a switch port No. 1 that corresponds to $\lambda_{c,1}$ corresponding to the ONT1, in Port Information, that is, VLAN (a) member information (13). In this case, since the service is basically a multicast broadcasting service and the depth has not reached M (14), the multicast type is set to a shared type ("SHARED") (15). The depth indicating the amount of use relative to the maximum service accommodation capacity indicates the number of maximally allowable multicast groups within the bandwidth $\lambda_b$.

For example, when the bandwidth $\lambda_b$ is B and the necessary bandwidth of a single broadcasting service is L, the number of the maximally allowable multicast groups is expressed as inf{B/L}. When the formation of a new multicast group is detected when the depth exceeds the highest value M, the multicast type of a corresponding group is set to a dedicated type ("DEDICATED") (16). The multicast type is a filtering flag that determines the method by which the OLT forwards downstream-multicast traffic. If the multicast type is set to the shared type, multicast traffic does not follow the port information registered in the Port Information produced by the VLAN, but is transmitted to the broadcast port corresponding to a shared channel $\lambda_b$. In contrast, when the multicast type is set to the dedicated type, a plurality of packets are copied and transmitted to an individual port according to the port information within a VLAN group corresponding to a corresponding group even in the case of broadcasting type traffic.

As shown in FIG. 3, the plurality of the multicast groups is generated by consistent IGMP queries. A port corresponding to a service, that is, ONT information, is allocated to each group and then maintained. In this case, the share index "SHARED INDEX", indicating the total number of ONTs registered in a service, in addition to the port information, is recorded for each group (17). This share index "SHARED INDEX" increases when an ONT that transmits an explicit IGMP response is added to a group after the group is formed, but decreases when an ONT is deleted from a corresponding group due to the occurrence of an explicit ICMP leave message or port timeout Time_Out (18). Through this, the OLT can easily detect the channel efficiency of shared $\lambda_b$ whenever a group is changed.

As described above, the multicast type of the multicast group M+1, which is generated after the depth has reached the highest allowable share index M, is set to the dedicated type (19). An ONT2, that is, a corresponding service component, receives multicast traffic through the data channel $\lambda_{b,2}$. In this case, the share index "SHARED INDEX" is 1, which is the same as that of the Group 1 (20). However, basically, the broadcasting service has continuity. In order to maintain the quality of a broadcasting service being serviced and reduce the complexity, group swapping is not performed. Thereafter, after the group M+2 is created, when an ONT 5 and an ONT 7 are added to the group M+2 as new members, the share index "SHARED INDEX" of a corresponding group increases to 3 (21). This means that the same multicast traffic must be copied to correspond to the number of members within a switch module through $\lambda_c$ that is independently allocated to each member ONT, and then transmitted in point-to-point mode. This results in a reduction in channel efficiency within a network. If such traffic is transmitted through $\lambda_b$ where the optical layer is shared, it is distributed by the optical splitter even if a single frame is transmitted. Therefore, multicasting is achieved in the optical layer, so that the frame processing of the switch module can be reduced. At the same time, since the use of the bandwidth can be reduced by [(share index−1)×L], the bandwidth necessary for data transmission can be efficiently maintained within the network.

In contrast, although, in the case of the Group 1, the multicast type "SHARED" is allocated in FCFS mode, the member of the group is ONT 1, which is very small (22). Accordingly, the entire efficiency of the shared channel is very low. In this case, the OLT performs group swapping with the group 1 having the lowest share index value "SHARED INDEX", when compared with the group M+2, in the groups to which the multicast type "SHARED" is allocated (23). As described above, the entire channel share index of $\lambda_b$ within the network after the group swapping increases by 2, thus resulting in the maximal utilization of the shared channel.

As a result, not only can a largest number of multicast groups within the definite bandwidth of the shared wavelength $\lambda_b$ be efficiently accommodated through such dynamic multicast group management, but broadcasting services and data services can be maximally separated. Accordingly, a stabilized Quality Of Service (QoS) policy on a service basis can be performed.

Figure 4:
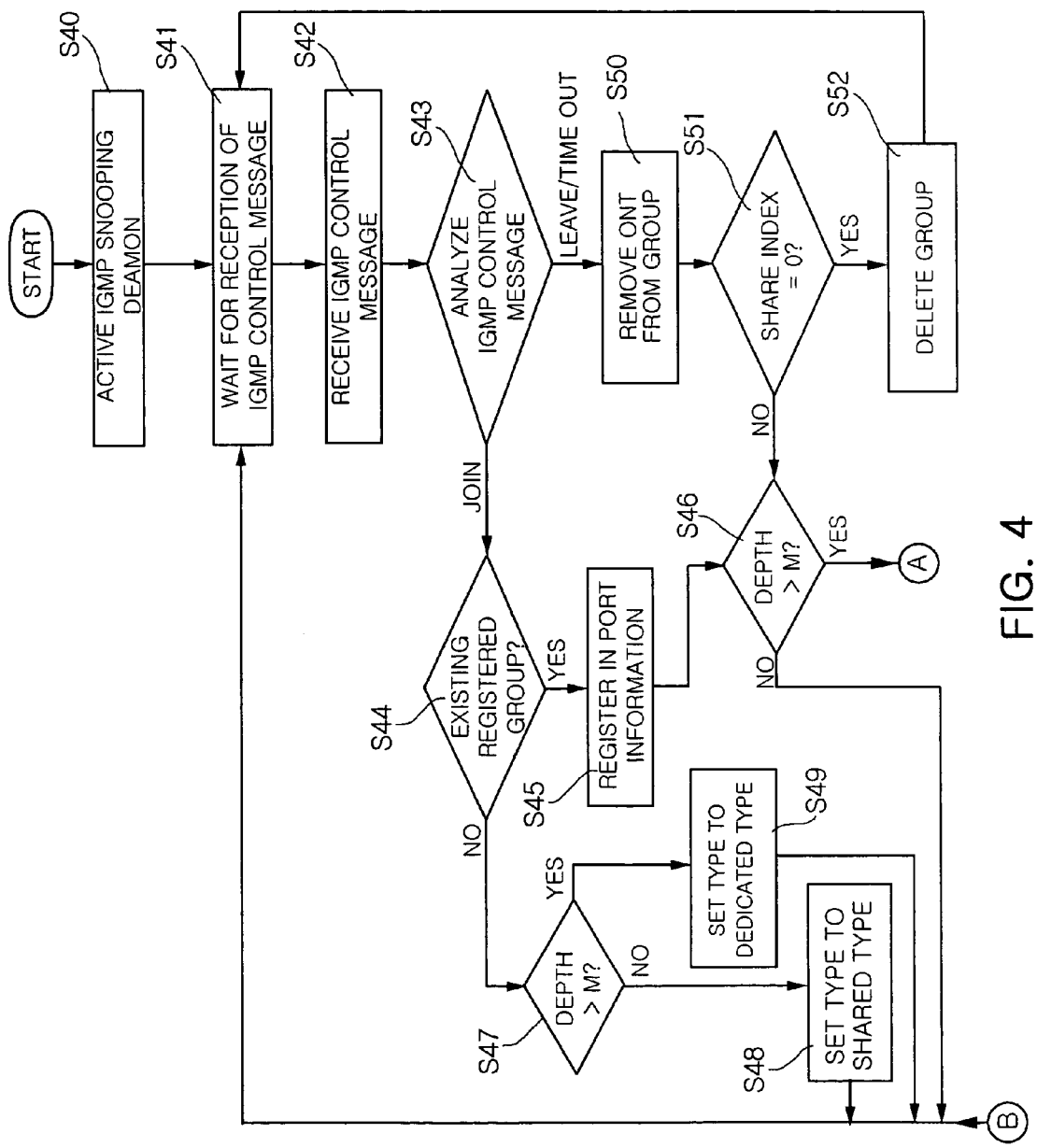
FIG. 4 is a flowchart showing a dynamic multicast group management and service wavelength allocation process in the OLT of the WDM-PON according to the present invention.

FIG. 4 is a flowchart illustrating a dynamic multicast group management and service wavelength allocation process in the OLT of the WDM-PON according to the present invention.

Referring to FIG. 4, in the case of a system cold start, an OLT 210 activates an IGMP snooping daemon at step S40, and waits for the reception of an IGMP control message between an individual ONT and a multicast server at step S41. If the IGMP control message is received at step S42, the OLT 210 analyzes the IGMP control message at step S43. In this case, if the received IGMP control message is the join message of a specific ONT for an IGMP query, the process proceeds to step S44. If the received IGMP control message is an explicit leave message or timeout for a specific query, the process proceeds to step S50. If the received IGMP control message is the join message, it is determined whether the ONT is an existing registered multicast group at step S44. If the ONT is the existing registered multicast group, a port corresponding to an ONT is registered in the Port Information at step S45. Thereafter, it is determined whether the current depth of the existing registered multicast group is greater than M at step S46. If it is determined that the current depth is greater than M, a procedure in which a current share index is improved through comparison of the share index "SHARED INDEX" (indicated by "A" in the drawing). If the current depth is smaller than M, the share index comparison procedure is not necessary. If it is determined that the received IGMP control message is a newly created multicast group, not the existing multicast group, at step S44, the depth of a current multicast group is checked at step S47, and which of shared and dedicated type transmission modes will be used is determined at steps S48 and S49. In other words, if the depth of a current multicast group is smaller than M, the shared type transmission mode is determined at step S48. If the depth of a current multicast group is greater than M, the dedicated type transmission mode is determined at step S49. In this case, if the new multicast group is the shared type at step S48, it means that sufficient $\lambda_b$ bandwidth exists. It is not necessary to improve the share index through the share index "SHARED INDEX" of each multicast group. Furthermore, when the new multicast group is registered as a new dedicated group at step S49, the current share index "SHARED INDEX" is 1, so that the comparison procedure of the share index is unnecessary.

If the received IGMP control message is the explicit leave message, or timeout for a specific query is generated, as a result of the analysis at step S43, the IGMP snooping daemon deletes a corresponding ONT port from the Port Information of the multicast group at step S50. It is then determined whether the number of the registered members of the multicast group is 0, that is, the share index is 0 at step S51. If it is determined that the number of the registered members of the multicast group is 0, a corresponding multicast group is deleted since it belongs to unnecessary service registration at step S52. If the share index is not 0, the depth of a current multicast group is compared with M at step S46 because the multicast group member may exist. If, as a result of the comparison at step S46, the depth of a current multicast group is greater than M, a procedure in which a current share index is improved through comparison of the share index "SHARED INDEX" (indicated by "A" in the drawing) is performed.

Figure 5:
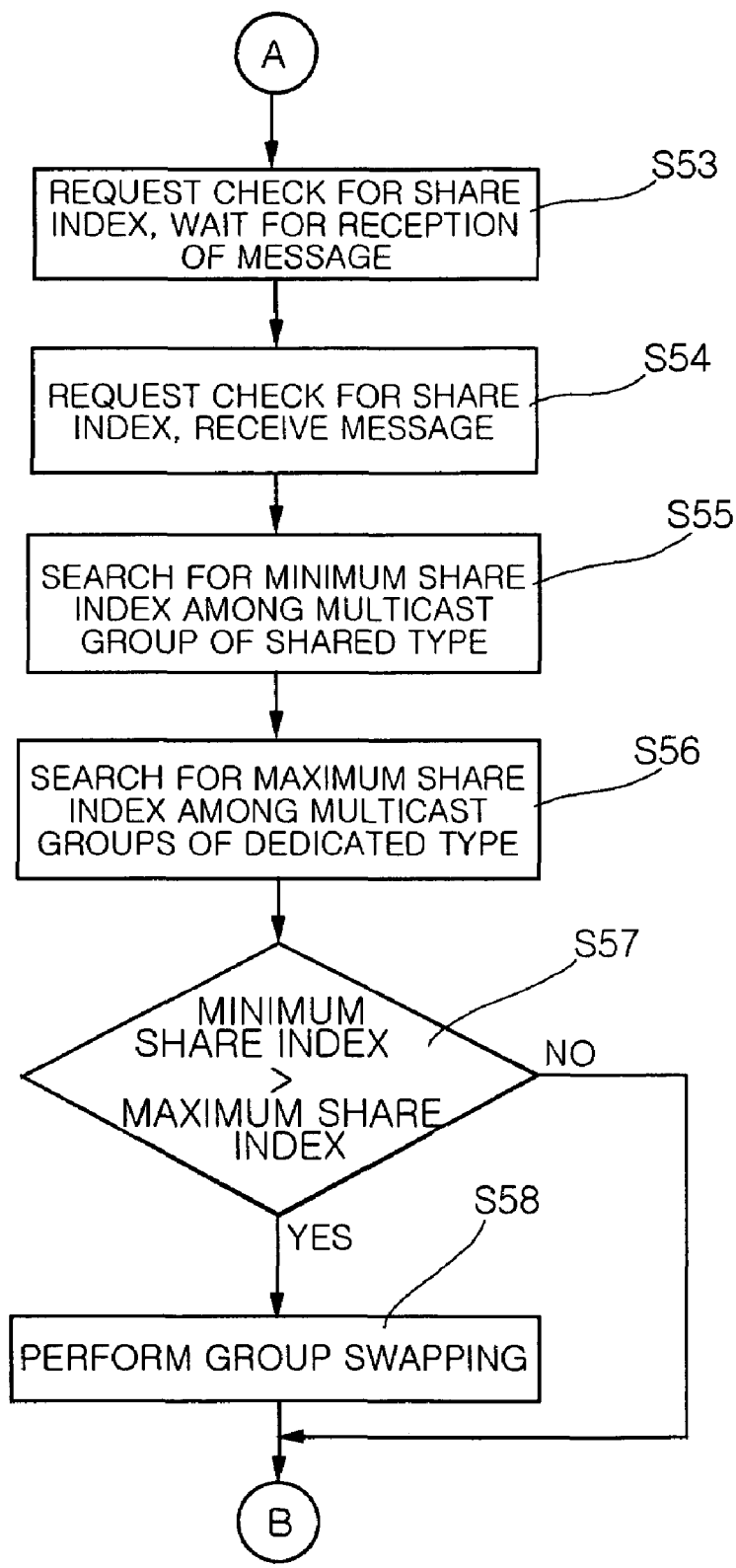
FIG. 5 is a flowchart showing a group swapping process that employs the share indices of wavelengths of dynamic multicast groups in the OLT of the WDM-PON according to the present invention.

FIG. 5 is a flowchart showing a group swapping process using the wavelength share indices of dynamic multicast groups in the OLT of the WDM-PON according to the present invention. FIG. 5 shows a process of checking and comparing the share index "SHARED INDEX" of an OLT and performing group swapping.

Referring to FIG. 5, the daemon waits for a message requesting the check of a typical share index at step S53. If the request message is received at step S54, the daemon searches for a group having the lowest share index among all the multicast groups of the shared type and a group having the highest share index among the dedicated type multicast groups at steps S55 and S56. In this case, if the former share index is greater than the latter share index, the process proceeds to step S41 of FIG. 4 without group swapping. If the latter share index is greater than the former share index, this means that the multicast type is set to the current dedicated type, and the band can be used more efficiently when the group is transmitted through individual data wavelengths using the shared wavelength. In this case, after the transmission types of the two groups are changed through group swapping at step S58, the process proceeds to step S41 of FIG. 4.

The above-described detailed description and content of the drawings illustratively show a preferred embodiment of the dynamic multicast group management method in a WDM-PON according to the present invention. Therefore, the present invention is not limited to the above description.

The IGMP snooping technology-based dynamic multicast group management method in a WDM-PON network in accordance with the present invention has the following effects.

First, all data physically support multicasting in a WCM layer. This allows much simpler multicasting and efficient use of bandwidth in an optical layer through an optical splitter than IP multicasting technology in which IP datagram is copied in an existing data network.

Second, the quality of a fixed and continuous broadcasting service is guaranteed. In this case, a continuous broadcasting service and a common data service are separated from each other and transmitted using different wavelengths, which can prevent the quality of the broadcasting service from being degraded due to the data service.

Third, it is possible to actively cope with variation in broadcasting and communication traffic between an OLT and an ONT in a WDM-PON network. More particularly, in the case of a FTTH WDM-PON network, the demand for the bandwidth of service traffic patterns of broadcasting and communication vary according to a user. In this case, the mode is properly adapted to a mode in which the bandwidth is dynamically managed according to each service bandwidth demand.

Fourth, it is possible to flexibly construct a communication-broadcasting convergence network. That is, an OLT monitors join and leave of multicast group between the multicast router and the ONT through IGMP snooping. The flexibility of construction of the convergence network is guaranteed and no increase in the complexity of protocols is caused to realize the network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of dynamically managing multicast groups for communication-broadcasting convergence based on IGMP snooping-based in a WDM-PON having an OLT and a plurality of ONTs, comprising:
   a first step of allowing the OLT to allocate individual data wavelengths $\lambda_c$ and a shared broadcasting wavelength $\lambda_b$ to the respective ONTs, and checking an IGMP control message between the individual ONTs and a multicast server;
   a second step of, if the message is a multicast group join message of a specific ONT as a result of the checking at the first step, determining whether the group is a newly created group or an existing registered group;
   a third step of, if it is determined that the group is a newly created group as a result of the determination at the second step, determining a multicast type of the group by ascertaining the depth of allowable maximum multicast groups within a bandwidth of the broadcasting wavelength $\lambda_b$; and
   a fourth step of, if it is determined that the group is an existing registered group as a result of the determination at the second step, determining a multicast type of the group by ascertaining the depth of allowable maximum multicast groups within the bandwidth of the broadcasting wavelength $\lambda_b$, and comparing a share index between two multicast groups in order to change the multicast types of the two multicast groups by performing group swapping.

2. The method according to claim 1, further comprising the steps of:
   if the message is an explicit group leave message of a specific ONT or timeout for a specific query as a result of the checking at the first step, removing the ONT from a corresponding group, and reducing the share index of the group; and
   checking the share index of the group from which the ONT is removed, and if the share index is 0, deleting the corresponding group, but if the share index is not 0, improving the share index of the group by ascertaining the depth of the allowable maximum multicast groups of the corresponding group.

3. The method according to claim 2, wherein, at the step of reducing the share index of the group, the share index of the corresponding group is reduced by the number of removed ONTs.

4. The method according to claim 2 wherein the step of improving the share index of the group comprises the steps of:
   searching for a minimum share index among shared type multicast groups;
   searching for a maximum share index among dedicated type multicast groups; and
   if the maximum share index is greater than the minimum share index, changing the types of the two multicast groups by performing group swapping.

5. The method according to claim 1, wherein the third step of determining the multicast type of the group comprises, if the depth of allowable maximum multicast groups of the newly created group is greater than a predetermined maximum value M, determining the multicast type of the group to be the dedicated type, and, if the depth of the allowable maximum multicast groups of the newly created group is smaller than the predetermined maximum value M, determining the multicast type of the group to be the shared type.

6. The method according to claim 5, wherein the share index of the multicast group of the dedicated type is 1.

7. The method according to claim 1, wherein the depth of the allowable maximum multicast groups is expressed by the following equation.

$$\text{Depth} = \inf\{B/L\}$$

where B is the bandwidth of the shared broadcasting wavelength allocated to ONTs by OLT, and L is a required bandwidth of a single broadcasting service.

8. A method of dynamically allocating multicast service wavelength for communication-broadcasting convergence based on IGMP snooping-based in a WDM-PON having an OLT and a plurality of ONTs, comprising:
   a wavelength allocation step of allowing the OLT to allocate individual data wavelengths $\lambda_c$ and a shared broadcasting wavelength $\lambda_b$ to the respective ONTs;
   a first data transmission step of allowing the OLT to transmit data for broadcasting through the shared broadcasting wavelength $\lambda_b$ and data for control through the individual data wavelengths $\lambda_c$;
   a determination step of determining whether the bandwidth of the shared broadcasting wavelength $\lambda_b$ is exceeded;

a second data transmission step of, if the bandwidth of the shared broadcasting wavelength $\lambda_b$ is not exceeded, continuing to transmit the data for broadcasting through the shared broadcasting wavelength $\lambda_b$, and if the bandwidth of the shared broadcasting wavelength $\lambda_b$ is exceeded, transmitting data for broadcasting and data for control, which are formed subsequently, through the individual data wavelength $\lambda_c$;

a share index ascertainment step of allowing the OLT to periodically ascertain share indices of wavelengths of multicast groups that employ the shared broadcasting wavelength and the data wavelengths; and a wavelength allocation change step of, if the share index of the wavelength of the multicast group that employs the broadcasting wavelength is smaller than the share index of the wavelength of the multicast group that employs the data wavelength, changing allocation of the wavelength of the multicast group so that the share index of the wavelength of the multicast group employing the broadcasting wavelength is maximized.

9. The method according to claim 8, wherein the data for control are data regarding registration in and removal from the multicast groups, and queries and responses of the multicast groups.

10. The method according to claim 8, wherein the share index ascertainment step comprises the step of ascertaining the share index of the wavelength whenever information about the multicast group is changed.

* * * * *